United States Patent [19]

König

[11] 4,048,860

[45] Sept. 20, 1977

[54] METHOD OF DETERMINING STANDARD SOUND LEVELS

[75] Inventor: Fritz König, Wuppertal, Germany

[73] Assignee: Losenhausen Maschinenbau AG, Dusseldorf, Germany

[21] Appl. No.: 668,823

[22] Filed: Mar. 22, 1976

[30] Foreign Application Priority Data

Apr. 30, 1975 Germany .............................. 2519151

[51] Int. Cl.² .............................................. G01H 3/10
[52] U.S. Cl. ........................................................ 73/556
[58] Field of Search ................... 73/556, 555, 552, 67, 73/70, 71.4; 179/1 N, 1 MN

[56] References Cited

U.S. PATENT DOCUMENTS

| | | | |
|---|---|---|---|
| 3,516,285 | 6/1970 | Seney | 73/71.4 |
| 3,781,782 | 12/1973 | Scott et al. | 73/70 |

OTHER PUBLICATIONS

Kundert et al.; *Sound and Vibration*, "Instrumentation Topics", pp. 16–20; Apr. 1972.

*Primary Examiner*—Richard C. Queisser
*Assistant Examiner*—Stephen A. Kreitman
*Attorney, Agent, or Firm*—Darbo, Robertson & Vandenburgh

[57] ABSTRACT

To determine standardized values of noise levels of machines a sound recording and reproducing instrument is employed to record the sound emission from a sound source of the type to be investigated. The recording and reproducing instrument is used as a reference source to obtain measured values of sound level on a standard and on a freely selected measuring place under standard conditions. The difference of the two values is applied to the value of sound level measured for the machine to be investigated on the selected measuring place under said standard conditions to yield standardized values of sound level.

4 Claims, No Drawings

METHOD OF DETERMINING STANDARD SOUND LEVELS

BACKGROUND AND SUMMARY OF THE INVENTION

This invention relates to a method of determining a standardized value of the sound level generated by a sound source to be investigated, using a sound level meter, a standard sound level measuring place, a selected sound level measuring place and sound recording and sound reproduction means.

Measuring and monitoring sound levels under standardized conditions is increasing in importance with respect to health effects caused by noise sources. In rules of environmental protection, therefore, measuring and testing the noise emitted from machines particularly such as used in the construction industry have an important role. National and international standard specifications concerning acoustic measurements have been published (see for instance German Industrial Standard (DIN) 45,63o and following, as well as the Rules and Test Methods issued by the European Community Commission). Also, governments intend to issue admission rules for construction machinery on a national and on an international basis directed to establishing some upper limiting level of noise emission from such machinery. For this reason companies manufacturing and selling machines for the construction industry do not only have an interest but additionally are legally obliged to measure and to check on the noise emitted from respective machines. The methods as given in the aforementioned rules, however, are not suited for wideranged general application.

Measurement of the noise originating from some machine will necessitate a standard sound level measuring place satisfying certain requirements with respect to acoustic conditions. Above all others, such requirements are that at the respective point at which the measurements are taken sound reflections etc. may not interfere with the sound emission issuing from the machine. Therefore the standard measuring place will have to be of such a kind that the undisturbed emissions of sound incident on a sound level meter from all directions in space above the surface on which the machine is positioned can be measured at a predetermined distance from the machine. Additionally, specific requirements will have to be made on the acoustic properties of the surface on which the machine is positioned.

Usually, such a standard sound level measuring place is not generally available to the manufacturer of or trader in construction machinery. This problem may be solved by using some measuring place which will meet the aforementioned requirements to carry out measurements of noise emission. However, the expense connected with such a procedure is unduly high considering that each respective machine will have to be transported to said standard measuring place and that all required measuring instrumentation will have to be installed temporarily at that place observing preset conditions.

To simplify measuring procedures it would be desirable to enable any manufacturer of or trader in construction machinery to conduct the required measurements at the site of his own plant. However, appropriate places satisfying the aforementioned requirements are not available at the plant site in most of the cases and not easily available of the plant site. For this reason it has already been suggested to measure the sound emission issuing from a reference sound source on a standard measuring place meeting the abovementioned requirements, and to repeat the same measurements using the same said reference sound source under identical conditions of operation on some selected measuring place. From a comparison of the measured values as obtained on the standard measuring place to the observed values as taken on said selected measuring place corrections will be gained. Such corrections may be applied to corresponding measurements on a sound source to be investigated to enable the measured values observed on said selected measuring place to be corrected so as to yield values as obtainable on the standard measuring place. However, there are just two kinds of reference sound sources available for carrying out such measurements, namely the so-called pistonphone which operates like a vibrating piston and the siren which works like a fan wheel.

Pistonphones are sound sources which will generate a practically monochromatic sound wave train of great coherence length. In the first place, this will cause sound waves reflected from the ground or, respectively, from the environment of the mounting position of the pistonphone to coherently interfere with sound waves immediately originating from said pistonphone to thus produce unaffectable errors. Furthermore, the range of sound frequencies emitted by the pistonphone is not only very narrow, but also the range of frequencies emitted from the pistonphone is entirely outside the sound frequencies usually occurring with sound sources of the type to be investigated. Therefore, a comparison of the measured values obtained with such reference sound source and the measured values of the sound source to be investigated is frought with considerable uncertainties. Therefore, the application of corrections as determined for the pistonphone to measured values as obtained from construction industry machines will only be possible with errors which will considerably exceed the tolerance limits set for measured values of sound sources to be investigated.

A sound generator operating on the principle of the fan wheel has the big advantage over the pistonphone in that it emits a broad spectrum of sound frequencies. However, the spectral density of such an emitter is not sufficiently constant over the presently considered range of frequencies. Additional errors result from the fact that the sound sources to be investigated generally will only emit sound within a rather narrow range of frequencies. This will also induce deviations outside the tolerance limits. If for instance the respective machine is positioned on grass ground the high frequencies are assumed to become attenuated which effect may be correspondingly and truly corrected for in case of a sufficiently broadband sound emission from the machine. If instead a Diesel driven rapid stroke tamper is investigated the main sound frequencies of which are emitted outside the range in which attenuation occurs, a different correction would have to be applied.

In summing up it may therefore be stated that none of the methods hitherto known in which the relation of a selected measuring place to the standard measuring place is established by employing a reference sound source is suited to correlate respective values measured at some individually selected measuring place to values measured at a standard measuring place. This is for purely technical reasons which reside in the different frequency emissions from the reference sources and from the sound sources to be investigated. This is also for economical reasons since the aforementioned reference sound sources are expensive in their purchase price and in their maintenance and operation as well.

Accordingly, the object to be achieved by the present invention is to provide a method of determining standardized values of sound level generated by sound sources to be investigated which are free of any measuring errors due to frequency differences between the reference sound source and the respective sound source under investigation. Also, the measured values as determined by such a method should be provided at low expenditure of measurement techniques and with errors only within preset tolerance limits.

In accordance with the invention said method comprises the following steps:
   a. Selecting a sound source from a group of sound sources including the sound source to be investigated, said group having common sound emission characteristics,
   b. recording the sound emission from said selected sound source on said sound recording means,
   c. supplying said sound reproduction means with said sound recording means on which the sound emission has been stored for replay,
   d. placing said sound reproduction means and said sound level meter on said standard measuring place at a predetermined distance from each other and measuring a first value (L1) of sound level,
   e. placing said sound reproduction means and said sound level meter on said selected measuring place at said predetermined distance from each other and measuring a second value (L2) of sound level,
   f. placing said sound source to be investigated and said sound level meter on said preselected measuring place at said predetermined distance from each other and measuring a third value (L3) of sound level, whereby the difference of said first and said second value of sound level when applied to said third value of sound level yields said standardized value of sound level.

According to the method of the invention steps (d) to (f) may also be conducted at different directions in space. Thus measured data corresponding to those in a measuring field as indicated in standardization rules may be obtained on the selected measuring place and converted into data as obtainable on the standard measuring place.

In accordance with the invention an improved standardized value of sound level is obtained by conducting the further additional steps of
   g. placing said sound reproduction means and said sound level meter on said standard measuring place with said sound level meter within the immediate short-range field of said sound reproduction means and measuring a fourth value (L4) of sound level and
   h. placing said sound reproduction means and said sound level meter on said selected measuring place within the immediate short-range field of said sound reproduction means and measuring a fifth value (L5) of sound level whereby said improved standardized value is obtained from said third value of sound level when the difference of said fourth and said fifth value of sound level are applied thereto.

DESCRIPTION OF SPECIFIC EMBODIMENT

In carrying out the method of the invention the first step is to select from a group of sound sources having common sound emission characteristics one sound source for recordal of its sound emission. In the case of construction industry machinery one machine is selected which is representative for the group f.i. in the frequency range and in the frequency distribution of its sound emission. The sound source to be investigated, of course, should be a member of said group.

The sound emission from the selected source is recorded on some freely selected measuring place. The recording may be done with any tape recorder of medium reproduction quality as the sound recording and sound reproducing means. The tape may be stored in any record storage facility which permits permanent access to noise sources of the respectively desired type. In this way at only very little expense in a very simple manner a reference sound source is obtained the emission characteristics of which are immediately comparable to those of the sound source to be investigated.

For determining the sound level values required the tape recorder is, then, installed in the standard measuring place at the position of the sound source at a predetermined distance from the sound level meter. The measured value thus obtained is a first value of sound level L1.

Followingly, the tape recorder is placed at the position of the sound source to be investigated on the selected measuring place which may for instance be situated on the terrain of the respective plant site. Under at least comparable conditions with respect to the standard measuring place, then, the sound immission incident at said predetermined distance from the tape recorder is measured. The measured value thus obtained is a second value of sound level L2.

Both of the sound levels obtained as before correlate values of sound level as measured on the selected measured place with values of sound level as measured on the standard measuring place, both under specified standard conditions. Thus any values of sound level as measured under the same specified standard conditions from a sound source having the same or at least similar characteristics of sound emission on the selected measuring place are most easily converted to standardized values of sound level. Accordingly, in the next step of the method of the invention the sound source, i.e. the machine to be investigated is placed at the position of the tape recorder on the selected measuring place. On operation of the machine its sound immission incident at the sound level meter under otherwise identical conditions is measured. The measured value thus obtained is a third value of sound level L3. The third measured value of sound level is corrected for the difference between the standard measuring place and the selected measuring place by applying the difference of said first and said second values of sound level to yield the desired standardized value $L_{ST}$ $$L_{ST} = L3 + L1 - L2.$$

By conducting the method of determining the standardized values of sound level in such a way expenditure for measurement techniques will be limited to a fraction of what hitherto had been considered necessary. In particular, transport of the machine to be investigated from the plant site to the standard measuring place may be entirely eliminated which is expensive since generally such a place will be far remote from the plant site. The method will result in a considerable facilitation and improvement in that the reference sound source is represented as a reproducing instrument which may be battery-powered and thus independent on external current supplies etc. Any safety measures and all others which are required in the prior methods to operate the sound source on the selected as well as on the standard measuring place may, therefore, be omitted. However, it is of considerable importance that in the present method the reference sound source and the sound source to be investigated have the same emission characteristics in their frequency and in their frequency distribution. Thus some substantial sources of error in the methods previously in use have been removed. Finally, the method as suggested permits continuous testing and monitoring of new and used machines in a particularly simple manner at an individual plant site. This is of eminent practical consequences with respect to continuously monitoring machines used in the construction industry for observance of legally prescribed noise limiting rules.

Further improvement in determining standardized sound level values according to the invention is obtained if the aforementioned measuring steps are carried out at different directions in space in which way the angular distribution of sound incident at the sound level meter on the selected measuring place is correlated with that on the standard measuring place.

An additional improvement in the standardized values of sound level determined according to the method of invention is achieved if the effects of different sound intensities are taken into consideration. For that purpose, the tape recorder is again placed on the standard measuring place. This time, however, the sound level meter is installed within the immediate short-range field of the tape recorder and a fourth value of sound level (L4) is measured. A fifth value of sound level (L5) is, then, measured under the same conditions on the selected measuring place. The improved standardized value of sound level is then obtained as $$L'_{ST} = L3 + L1 - L2 - L4 + L5.$$

In such a way, incidental or intentional differences in the volume of sound reproduction are corrected for.

The invention is claimed as follows:

1. Method of determining a standardized value of the sound level generated by a sound source to be investigated, using a sound level meter, a standard sound level measuring place, a selected sound level measuring place and sound recording and sound reproduction means, said method comprising the steps of:
   a. Selecting a sound source from a group of sound sources including the sound source to be investigated, said group having common sound emission characteristics,
   b. recording the sound emission from said selected sound source on said sound recording means,
   c. supplying said sound reproduction means with said sound recording means on which the sound emission has been stored for replay,
   d. placing said sound reproduction means and said sound level meter on said standard measuring place at a predetermined distance from each other and measuring a first value (L1) of sound level,
   e. placing said sound reproduction means and said sound level meter on said selected measuring place at said predetermined distance from each other and measuring a second value (L2) of sound level,
   f. placing said sound source to be investigated and said sound level meter on said selected measuring place at said predetermined distance from each other and measuring a third value (L3) of sound level, whereby the difference of said first and said second value of sound level when applied to said third value of sound level yields said standardized value of sound level.

2. Method as claimed in claim 1, comprising further conducting steps (d) to (f) at different directions of space.

3. Method as claimed in claim 1 comprising the additional steps of:
   g. placing said sound reproduction means and said sound level meter on said standard measuring place with said sound level meter within the immediate short-range field of said sound reproduction means and measuring a fourth value (L4) of sound level at a first volume adjustment of said sound reproduction means, and
   h. placing said sound reproduction means and said sound level meter on said selected measuring place within the immediate short-range field of said sound reproduction means and measuring a fifth value (L5) of sound level, whereby the difference of said fourth and said fifth value of sound level when applied to said third value of sound level yields an improved said standardized value of sound level.

4. Method as claimed in claim 3 comprising further conducting steps (d) to (h) at different directions in space.